United States Patent [19]
Pott

[11] Patent Number: 6,053,154
[45] Date of Patent: Apr. 25, 2000

[54] EXHAUST GAS RECYCLING ARRANGEMENT WITH INDIVIDUAL CYLINDER THROTTLING

[75] Inventor: Ekkehard Pott, Gifhorn, Germany

[73] Assignee: Volkswagen AG, Wolfsburg, Germany

[21] Appl. No.: 09/119,373

[22] Filed: Jul. 20, 1998

[30] Foreign Application Priority Data

Jul. 19, 1997 [DE] Germany .................... 197 31 129

[51] Int. Cl.[7] ................................. F02M 25/07
[52] U.S. Cl. ..................... 123/568.11; 123/568.12; 123/568.2
[58] Field of Search .............. 123/568.11, 568.12, 123/568.13, 568.15, 568.17, 568.18, 568.19, 568.2

[56] References Cited

U.S. PATENT DOCUMENTS

| | | | |
|---|---|---|---|
| 4,142,492 | 3/1979 | Kobayashi et al. | 123/568.11 |
| 4,506,633 | 3/1985 | Britsch | 123/568.11 |
| 5,121,734 | 6/1992 | Grieshaber et al. | 123/568.17 |
| 5,517,976 | 5/1996 | Bachle et al. | 123/568.12 |
| 5,562,085 | 10/1996 | Kosuda et al. | 123/568.11 |

FOREIGN PATENT DOCUMENTS

| | | |
|---|---|---|
| 0764771 | 3/1997 | European Pat. Off. . |
| 3009968 | 9/1980 | Germany . |
| 3810750 | 10/1988 | Germany . |

*Primary Examiner*—Willis R. Wolfe
*Attorney, Agent, or Firm*—Baker Botts L.L.P.

[57] ABSTRACT

Selective rich operation of an individual cylinder of an engine is accomplished by returning exhaust gas into an intake duct specific to the individual cylinder and providing an individual throttle flap in the intake duct. The exhaust gas is supplied either from a common exhaust duct or from a specific cylinder exhaust duct for the cylinder having a throttled intake duct.

9 Claims, 1 Drawing Sheet

EXHAUST GAS RECYCLING ARRANGEMENT WITH INDIVIDUAL CYLINDER THROTTLING

BACKGROUND OF THE INVENTION

This invention relates to selective recycling operation for individual cylinders of an internal combustion engine having exhaust gas recycling and to an arrangement for practicing such single cylinder recycling operation.

To achieve increased richness of the exhaust gas in internal combustion engines, for example for desulfurization and/or regeneration of an Nox reservoir, it is known to return exhaust gas from a common exhaust line into a common intake duct supplying combustion gas to all of the cylinders of the engine. At least in the case of aspirating Diesel engines, it is also known that the exhaust gas return rate can be raised by throttling of the aspirated fresh air with a manifold throttle flap.

In addition, it is known that the intake to individual cylinders of an internal combustion engine may be throttled by arranging a tingle throttle flap in the individual intake line for the cylinder. With this arrangement, however, it is not possible to achieve a nearly oxygen-free exhaust gas flow.

SUMMARY OF THE INVENTION

Accordingly, it is an object of the present invention to provide a method and arrangement for single-cylinder throttling in an engine having exhaust gas recirculation.

Another object of the invention is to provide an internal combustion engine having single-cylinder throttling with an exhaust gas return, in which the proportion of oxygen in the aspirated intake gas can be simply and securely reduced, and to provide; a method for selective reduction of the proportion of oxygen in the aspirated gas.

These and other objects of the invention are attained by providing at least one cylinder of an internal combustion engine having an exhaust gas return with an individual exhaust gas return line and an individual throttle flap in the combustion gas intake line for that cylinder to control the proportion of oxygen in the combustion gas supplied to the cylinder. In this way, selective rich operation of individual cylinders of an internal combustion engine can be achieved.

Preferably, the exhaust gas to be returned is taken either from the combined exhaust outlet from the engine, or from the particular cylinder exhaust line for the throttled cylinder, and is supplied to the combustion gas intake line for that cylinder.

The returned exhaust gas may additionally be supplied to the common combustion gas intake duct. Also, the exhaust gas to be returned may be cooled.

The internal combustion engine according to the invention comprises at least one throttlable cylinder in whose direct intake duct a single throttle flap is arranged, and an exhaust gas return line controlled by a valve which returns exhaust gas to the specific cylinder combustion gas intake duct which can be throttled by a second valve.

Preferably, the exhaust gas return line draws the exhaust from the common exhaust duct of the engine or from the specific exhaust duct of the throttlable cylinder and, desirably, at least one cooling device is arranged in the exhaust gas return line.

The exhaust gas recycling arrangement according to the invention makes possible a variation of the lambda for each throttled cylinder with little or no diminution of the total mass of the aspirated combustion gas.

BRIEF DESCRIPTION OF THE DRAWING

Further objects and advantages of the invention will be apparent from a reading of the following description in conjunction with the accompanying drawing which is a schematic diagram illustrating a representative embodiment of an exhaust gas recycling arrangement with individual cylinder throttling for a four-cylinder engine.

DESCRIPTION OF PREFERRED EMBODIMENTS

Figure 1:
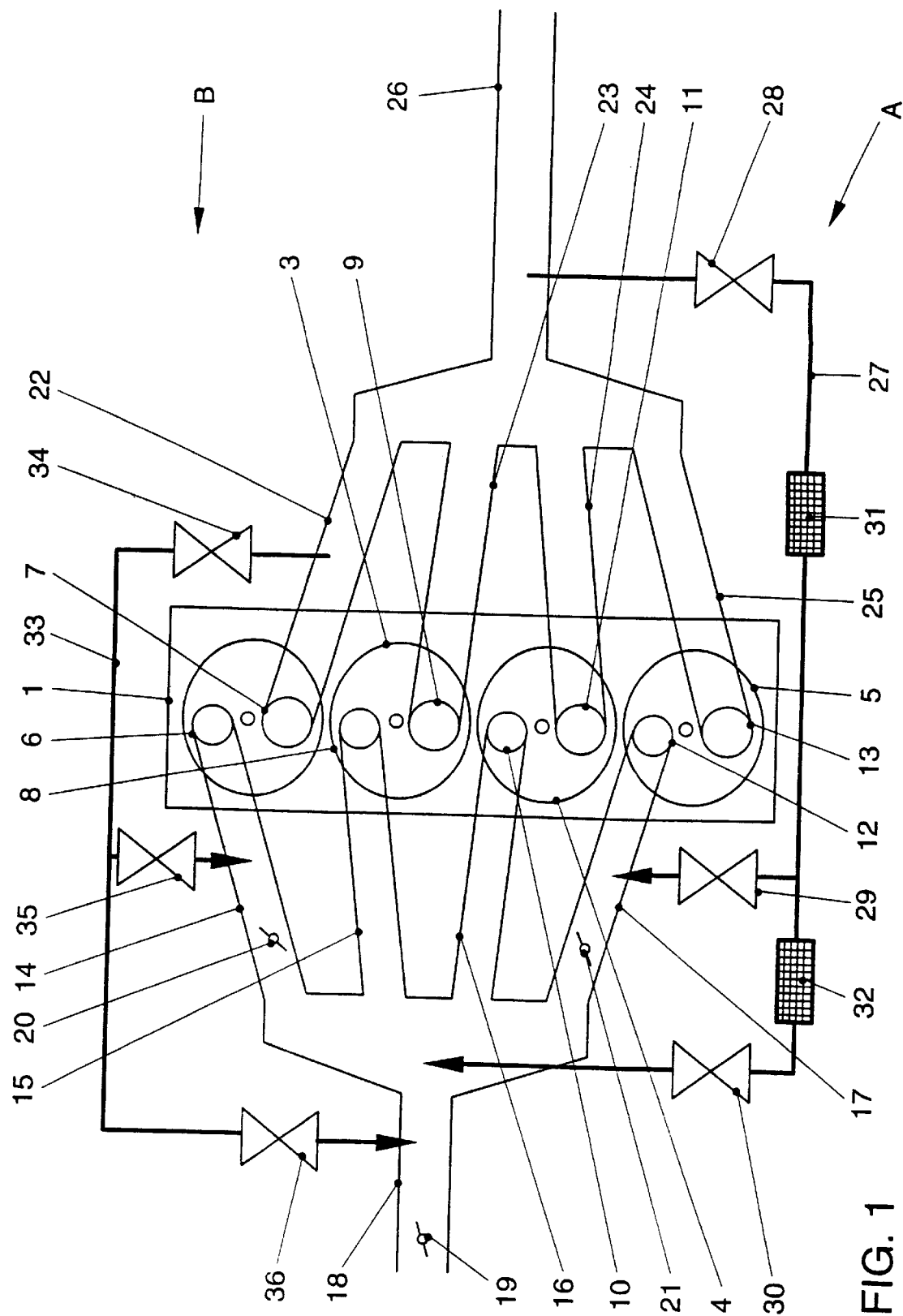

In the typical embodiment of the invention schematically shown in FIG. 1, a cylinder-selective throttling and exhaust gas return arrangement is provided in an internal combustion engine 1 having four cylinders 2, 3, 4, and 5 and corresponding inlet valves 6, 8, 10 and 12 and outlet valves 7, 9, 11 and 13, respectively. The inlet valves are connected by corresponding individual cylinder intake ducts 14, 15, 16 and 17 to a common intake duct 18 having a manifold throttle flap 19. In addition, as shown in FIG. 1, an individual throttle flap 20 is mounted in the individual cylinder intake duct 14 of the first cylinder and another throttle flap 21 is mounted in the individual cylinder intake duct 17 of the fourth cylinder, for selective throttling of the combustion gas supplied to, the first and fourth cylinders 2 and 5 respectively.

The outlet valves 7, 9, 11 and 13 of the corresponding cylinders 2, 3, 4, and 5 are connected to individual cylinder exhaust ducts 22, 23, 24 and 25 which lead to a common exhaust duct 26. Two different exhaust gas return arrangements are provided for the first and fourth cylinders 2 and 5. In one alternative, A, exhaust gas is withdrawn by an exhaust gas return line 27 from the common exhaust duct 26 through a control valve 28 and supplied through a valve 29 into the cylinder intake duct 17 of the fourth cylinder 5 downstream from the individual throttle flap 21. In addition, the exhaust gas return line 27 also supplies the exhaust gas through another valve 30 into the common intake duct 18. The valves 29 and 30 are separately controlled so that the exhaust gas can be introduced only into the cylinder intake duct 17 or only into the common intake duct 19 or into both. In addition, exhaust gas coolers 31 and 32 may be mounted in the exhaust gas return line 27.

In another alternative, B, exhaust gas is supplied by an exhaust gas return line 33 directly from the individual exhaust gas duct 22 of the first cylinder 2 into the individual cylinder intake duct 14 of the first cylinder 2 downstream from the individual throttle flap 20 for that cylinder. The exhaust gas return line 33 has valves 34 and 35 for controlling the exhaust return to the cylinder 2. In addition, a valve 36 controls the supply of exhaust gas to the common intake duct 18. These valves are separately controllable in the same manner described for the valves 27, 29 and 30 and coolers similar to the coolers 31 and 32 may be included in the EGR line 33.

If desired, both the alternatives, A and B, may be utilized at the same time, for example by supplying the throttled cylinders with exhaust from the individual ducts according to alternative A and the unthrottled cylinders with exhaust from the common outlet duct according to alternative B. The apportionment of the total exhaust gas return flow may be accomplished by way of the control valves 28 and 34 and optionally by setting the intake manifold throttle flap 19. The apportionment of the exhaust gas return flow to the throttled cylinders 2 and 5 is effected by the setting of the individual throttle flaps 20 and 21 to change the suction with respect to the unthrottled cylinders and/or by the setting of the valves 27 and 28 and 35 and 36 respectively.

Although the invention has been described herein with reference to specific embodiments, many modifications and variations therein will readily occur to one skilled in the art. Accordingly, all such variations and modifications are included within the intended scope of the invention.

What is claimed is:

1. A method for selective rich operation of individual cylinders in an internal combustion engine having exhaust gas return comprising providing an individual throttle flap in an intake duct specific to one of the cylinders, and returning exhaust gas directly to the intake duct for the cylinder having the individual throttle flap for mixing with combustion gas supplied through the intake duct to control the proportion of oxygen in the combustion gas supplied to the cylinder.

2. A method according to claim 1 comprising taking the exhaust gas to be returned from a common exhaust duct for all of the cylinders of the engine.

3. A method according to claim 1 comprising taking the exhaust gas to be returned from an exhaust duct specific to the cylinder having the individual throttle flap.

4. A method according to claim 1 further comprising returning exhaust gas additionally into a common intake duct for all of the cylinders.

5. A method according to claim 1 comprising cooling the returned exhaust gas.

6. An internal combustion engine arrangement comprising an engine having at least one cylinder provided with an individual cylinder intake duct having an individual throttle flap, an exhaust gas return line connected to the individual cylinder intake duct, and a valve in the exhaust gas return line to control mixing of exhaust gas with combustion gas supplied through the intake duct to control the proportion of oxygen in the combustion gas supplied to the cylinder.

7. An arrangement according to claim 6 wherein the exhaust gas return line is connected to receive exhaust gas from a common exhaust duct from the engine.

8. An arrangement according to claim 6 wherein the exhaust gas return line is connected to receive exhaust gas from an exhaust gas duct specific to the cylinder having an individual intake duct with an individual throttle flap.

9. An arrangement according to claim 6 including cooling means in the exhaust gas return line.

* * * * *